(12) United States Patent
Kawakami

(10) Patent No.: US 7,059,594 B2
(45) Date of Patent: Jun. 13, 2006

(54) WORK SUPPORT

(75) Inventor: Takayuki Kawakami, Kawanishi (JP)

(73) Assignee: Pascal Engineering Corporation, Hyogo (JP)

( * ) Notice: Subject to any disclaimer, the term of this patent is extended or adjusted under 35 U.S.C. 154(b) by 198 days.

(21) Appl. No.: 10/492,124

(22) PCT Filed: Oct. 15, 2001

(86) PCT No.: PCT/JP01/09049

§ 371 (c)(1),
(2), (4) Date: May 3, 2004

(87) PCT Pub. No.: WO03/033201

PCT Pub. Date: Apr. 24, 2003

(65) Prior Publication Data

US 2004/0256779 A1    Dec. 23, 2004

(51) Int. Cl.
*B23Q 3/00* (2006.01)

(52) U.S. Cl. ...................................... 269/309

(58) Field of Classification Search .................. 269/22, 269/20, 27, 30, 32, 296, 309, 310; 188/67, 188/129

See application file for complete search history.

(56) References Cited

U.S. PATENT DOCUMENTS

| 4,717,161 A | * | 1/1988 | Stremeckus | ................. 277/562 |
| 4,934,672 A | * | 6/1990 | Craft | .......................... 269/310 |
| 5,957,443 A | | 9/1999 | Mascola | |

* cited by examiner

*Primary Examiner*—Robert C. Watson
(74) *Attorney, Agent, or Firm*—Jordan and Hamburg, LLP

(57) ABSTRACT

A workpiece support provides enhanced reliability of operation and enhanced durability. The workpiece support comprises a rod, a sleeve body, a case member, a scraper, an external peripheral hydraulic chamber, and oil passages, and is further provided with an air passage formed between the rod and the internal peripheral surface of the sleeve body, and connected to the small gap between the rod and the scraper, and an air input port for supplying compressed air to the air passage; wherein compressed air is supplied from the air input port to the air passage and expelled from the small gap between the rod and the scraper when the rod is retracted.

4 Claims, 4 Drawing Sheets

WORK SUPPORT

TECHNICAL FIELD

The present invention relates to a workpiece support that is designed so that a sleeve body externally fitted on a rod is elastically deformed by oil pressure, and the rod is locked, and relates particularly to a workpiece support that is improved so as to increase the reliability and durability of the operation of the workpiece support.

BACKGROUND OF THE INVENTION

Workpiece supports for locking and supporting workpiece on a workpiece pallet, for example, have been provided for use in machining workpiece and the like. The present applicant has proposed and submitted patent applications for various workpiece supports (also referred to as hydraulic locking devices) (see Japanese Utility Model Application Laid-Open Nos. S59-128902, H6-47710, and other publications), particularly workpiece supports with a simplified structure.

The workpiece support with a simplified structure is provided with a rod, a sleeve body that is externally fitted on the rod and is elastically deformable so as to shrink in diameter, a case member for supporting the sleeve body, a scraper externally fitted on the rod and retained by the leading end of the case member, for scraping debris adhering to the external peripheral surface of the rod when the rod is retracted, an external peripheral hydraulic chamber formed on the external periphery of the sleeve body, and a hydraulic cylinder for moving the rod in the axial direction; and the like.

When workpiece is supported by this workpiece support, the workpiece is set on top of the workpiece support, and oil pressure is supplied from an oil pressure supply source to a hydraulic operating chamber. Whereupon, a rod-moving hydraulic cylinder is actuated, the piston member of the hydraulic cylinder moves upward, and the rod advances upward by the urging force of a compression coil spring held on one end by the piston member. The output part at the leading end of the rod lightly contacts the workpiece with an extremely small force.

As the hydraulic operating chamber of the hydraulic cylinder is then connected with the external peripheral hydraulic chamber via an oil passage, oil pressure is developed in the external peripheral hydraulic chamber on the external periphery of the sleeve body, the sleeve body is elastically deformed so as to shrink in diameter to firmly lock the rod, and the workpiece is supported by the rod. The urging force of the aforementioned compression coil spring must be pre-set extremely low in this workpiece support in order for the rod to be firmly locked after the workpiece is held lightly without elastic deformation occurring in the workpiece.

However, in the conventional workpiece support, fine shavings and dust adhering to the surface of the rod and fine shavings and dust scraped off by the scraper penetrate into the apparatus through the small gap between the rod and the scraper and adhere to the internal surfaces of the scraper and sleeve body, particularly when the rod is retracted. In this case, the sliding resistance of the rod with the sleeve body increases, the rod ceases to advance smoothly, and mechanical failure occurs. Specifically, because the urging force of the compression coil spring for moving the rod upward is extremely weak, smooth advancing movement of the rod is impeded by the sliding resistance between the rod and the sleeve body. Durability also decreases markedly as the rod and sleeve body are roughened and caused to rub against each other.

Furthermore, as fine shavings and dust adhere to the internal surface of the scraper, cutting oil on the surface of the rod more easily penetrates into the apparatus. Because the workpiece support is configured such that the rod is locked by friction acting between the rod and the sleeve body, when cutting oil penetrates between the rod and the sleeve body, the friction acting between the rod and the sleeve body decreases, and the support functionality of the workpiece support declines. In this case, during machining, for example, the rod tends to move slightly while the workpiece is subjected to repeated shaking.

An object of the present invention is to secure the operational reliability and increase the durability of a workpiece support by ensuring that fine shavings and the like do not penetrate into the apparatus from the small gap between the rod and the scraper.

DISCLOSURE OF THE INVENTION

The workpiece support of the present invention has a rod; a sleeve body that is externally fitted on the rod and that is elastically deformable so as to shrink in diameter; a case member for supporting the sleeve body; a scraper externally fitted on the rod and retained by the leading end of the case member, for scraping debris adhering to the external peripheral surface of the rod when the rod is retracted; an external peripheral hydraulic chamber formed on the external periphery of the sleeve body; and an oil passage for supplying oil pressure to the external peripheral hydraulic chamber; further characterized in being provided with an air passage formed between the aforementioned rod and the internal peripheral surface of the sleeve body, with the passage being connected to the gap between the rod and the scraper; and an air input port for supplying compressed air to the air passage.

When workpiece is supported by this workpiece support, after the workpiece is set on top of the workpiece support and the rod is moved forward to as to come in contact with the workpiece, oil pressure from an oil pressure supply source is supplied to the hydraulic operating chamber via the oil passage. Oil pressure is thereby developed in the external peripheral hydraulic chamber on the external periphery of the sleeve body, and the sleeve body is elastically deformed so as to shrink in diameter, thereby firmly locking the rod.

When the rod is retracted, the rod is retracted by the elastic urging force of the compression coil spring, for example, when the valve of the oil pressure supply source is switched to the discharge position. For example, compressed air is supplied to the air passage from the air input port and expelled from the small gap between the rod and the scraper when the rod is retracted. The scraper scrapes off the cutting oil, fine shavings, dust, or other debris adhering to the external peripheral surface of the rod when the rod is retracted, and the scraped off debris can be reliably blown off to the outside by the expelled compressed air, and can be prevented from penetrating into the apparatus from the small gap between the rod and the scraper.

Also, compressed air may be continuously supplied and expelled from the small gap between the rod and the scraper during use of the workpiece support or during retraction of the rod.

Also, compressed air may be continuously supplied and maintained in a state so as to fill the small gap between the rod and the scraper at a pressure at which the air would not be expelled from the gap, in order to prevent foreign matter from penetrating into the small gap between the rod and the scraper.

Also, the position on the case member in which the scraper is held may not be limited to the leading end of the case member. A plurality of air nozzles formed in the leading end portion of the case member, for forming a curtain of compressed air so as to cover the external periphery of the rod protruding outside the leading end of the case member, may be provided so as to connect with the air passage formed between the rod and the internal peripheral surface of the sleeve body, and the aforementioned air passage may also not be connected to the gap between the rod and the scraper.

In this case, compressed air is continuously supplied from the air input port to the air passage during use of the workpiece support or retraction of the rod, and a curtain of compressed air from a plurality of air nozzles is formed so as to cover the external periphery of the rod protruding outside the leading end of the case member. Cutting oil, fine shavings, and dust, can be blocked by the curtain of compressed air and prevented from penetrating into the space between the internal peripheral surface of the sleeve body and the rod from the plurality of air nozzles.

When a hydraulic cylinder is installed for actuating the rod such that the rod protrudes from the leading end of the case member, oil pressure is supplied from the oil pressure supply source to the hydraulic operating chamber of the hydraulic cylinder, whereupon the rod is caused to protrude from the leading end of the case member and is thus able to support the workpiece. Oil pressure then develops in the external peripheral hydraulic chamber on the external periphery of the sleeve body, the sleeve body undergoes elastic deformation so as to shrink in diameter, and the rod is firmly locked.

PREFERRED EMBODIMENT OF THE INVENTION

An embodiment of the present invention will be described hereinafter with reference to the drawings.

Figure 1:
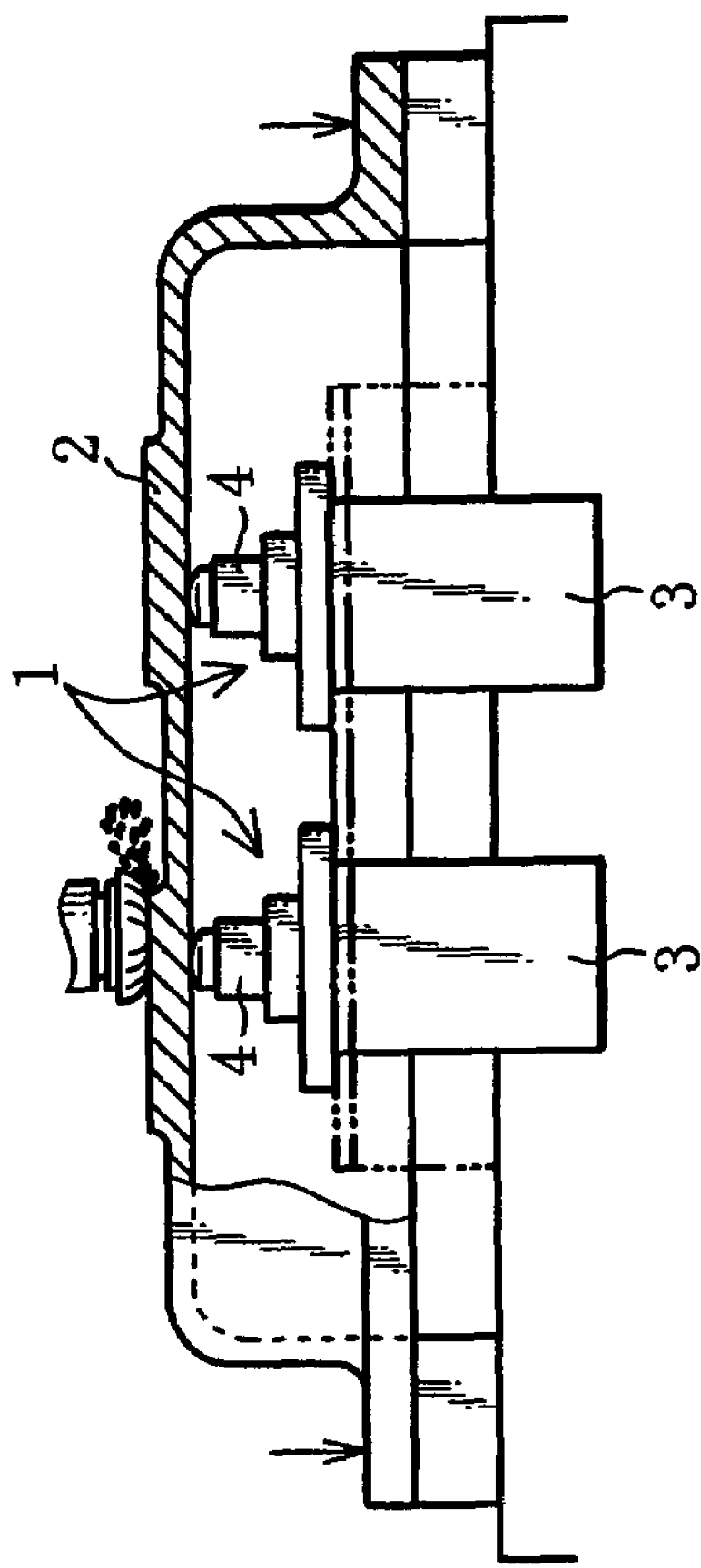
FIG. 1 is a front view of the workpiece support according to an embodiment of the present invention.
Figure 2:
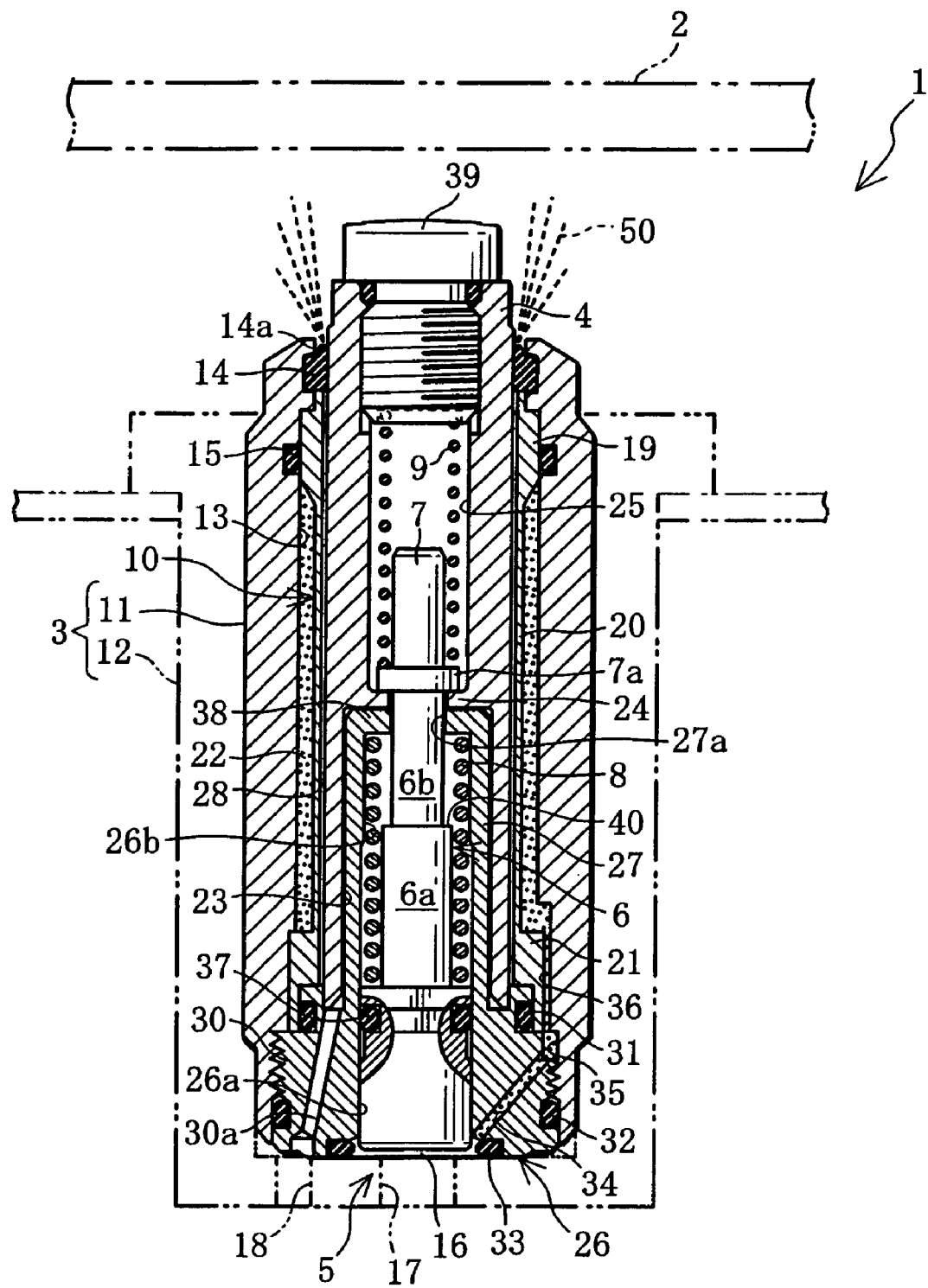
FIG. 2 is a vertically cross-sectional view of the workpiece support in a standby state.

As shown in FIG. 1, the workpiece support 1 of the present embodiment is for supporting the workpiece 2 from underneath and preventing the workpiece 2 from vibrating during machining. As shown in FIG. 2, the workpiece support 1 has a substantially cylindrical case member 3, a rod 4, a rod-driving hydraulic cylinder 5, a shaft 6, a shaft member 7, compression coil springs 8, 9, a metal sleeve body 10.

Figure 3:
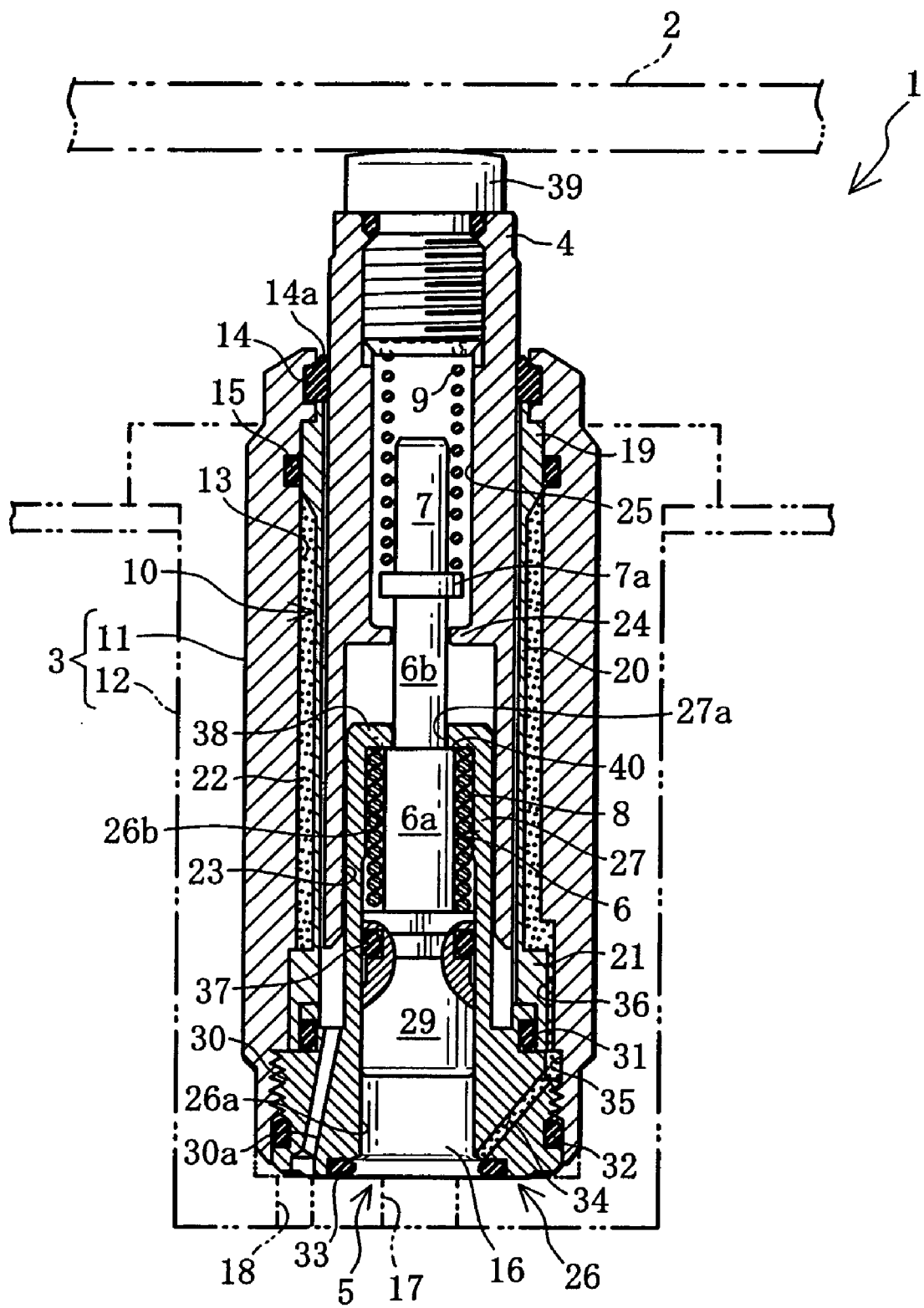
FIG. 3 is a vertically cross-sectional view of the workpiece support in a workpiece-supporting state.

First description will be made on case member 3. As shown in FIGS. 2 and 3, the case member 3 is formed so as to open to the outside from the bottom end upwards, and comprises a case main body 11 open at both ends and a case cover 12 externally fitted on and fixed to the case main body 11.

A rod-containing hole 13 is formed in the case main body 11, and the scraper 14 and seal members 15 are provided therein. As regards the scraper 14, the scraper 14 is made of synthetic resin and is externally fitted on the rod 4 and retained by the top end wall of the case member 3, and the top end part thereof is formed into a tapered part 14a that is slanted so that its diameter decreases in the upward direction to allow debris adhering to the external peripheral surface of the rod 4 to be scraped off when the rod 4 is retracted.

The case cover 12 has a closed-end cylindrical structure and a flange portion formed at the top thereof, and is supported at the flange portion on a prescribed mounting portion. An oil pressure supply port 17 for supplying oil pressure to the hydraulic operating chamber 16 of the hydraulic cylinder 5, and an air input port 18 are formed in the bottom wall of the case cover 12.

Next, descriptions on the sleeve body 10 will be made.

The sleeve body 10 comprises a securing ring top 19, thin-walled cylinder 20, and securing ring bottom 21 which are formed sequentially in this order from the top to the bottom thereof, and the securing ring top 19, thin-walled cylinder 20, and securing ring bottom 21 are integrally formed. The securing ring top 19 is locked by the top end wall of the case main body 11 from above, and the securing ring bottom 21 is sandwiched and held in place between the case main body 11 and the hydraulic cylinder 5. The thin-walled cylinder 20 is configured so as to be able to shrink in diameter by elastic deformation, a ring-shaped external peripheral hydraulic chamber 22 is formed on the external periphery of the thin-walled cylinder 20 between the thin-walled cylinder 20 and the case main body 11, and oil is filled into the external peripheral hydraulic chamber 22.

Next, the rod 4 will be described. As shown in FIGS. 2 and 3, The rod 4 is slidably inserted into the sleeve body 10, a cylinder hole 23 with a length corresponding to approximately ⅔ of the entire length of the rod 4 from the bottom end is formed in the lower half of the rod 4, and a cylindrical hole 25 with a smaller diameter than the cylinder hole 23 is formed in the upper portion than the cylinder hole 23 across a middle wall 24. A cylinder body 27 of the hydraulic cylinder 5 is fitted inside the cylinder hole 23, and the rod 4 is configured so as to be able to slide up and down guided by the sleeve body 10 and the cylinder body 27.

An air passage 28 is formed between the rod 4 and the internal peripheral surface of the sleeve body 10, compressed air 50 at a pressure (0.02 MPa, for example) that is equal to or greater than the contact pressure of the scraper 14 is supplied from the air input port 18 to the air passage 28, and the compressed air 50 is supplied through the air passage 28 to the small gap between the rod 4 and the scraper 14 and expelled to the outside.

Next, the hydraulic cylinder 5 will be described. The hydraulic cylinder 5 has a cylinder member 26 and a piston member 29. The cylinder member 26 comprises a cylinder base 30 fitted and screwed into the bottom end of the case main body 11, and the cylinder body 27 extending upwards from the cylinder base 30. A cylinder hole 26a and spring containing hole 26b are formed in the cylinder member 26.

The cylinder base 30 is provided with a passage 30a connected to an air passage 28 from an air input port 18, and a shaft passing hole 27a is a formed on the upper end portion 38 of the cylinder body 27. Seal members 31, 32, 33 are also provided.

The piston member 29 is fitted in the cylinder hole 26a so as to be able to slide up and down in oil tight fashon. An oil operating chamber 16 of the hydraulic cylinder 5 is formed with the peripheral surface of the cylinder hole 26a, the piston member 29 and the case cover 12.

An oblique oil passage 34, a ring-shaped oil passage 35, and one or more narrow-bore oil passages 36 are formed for connecting the hydraulic operating chamber 16 with the external peripheral hydraulic chamber 22. The oblique oil passage 34 is formed in the cylinder base 30, the ring-shaped oil passage 35 is formed between the cylinder base 30 and the case main body 11, and the narrow-bore oil passages 36 are formed in the external periphery of the securing ring bottom 21. Also, a seal member 37 is fitted on the piston member 29.

Next, descriptions will be made on the compression coil spring 8 for retractably actuating the piston member 29 and rod 4 downward. In upper portion of a cylinder hole 26a and a spring containing hole 26b, a spring member 8 for elastically urging the rod 4 downward is prvided, the bottom end of the spring member 8 is held by the piston member 29, the top end of the spring member 8 is held by the top end portion 38 of the cylinder member 26, and the piston member 29 is elastically urged downward with respect to the cylinder member 26 by the spring member 8.

Next, the shaft members 6, 7 and compression coil spring 9 will be described. An upright shaft member 6 is integrally formed with the piston member 29 and extends upward from the piston member 29, a flanged shaft member 7 is screwed into the shaft member 6, and the piston member 29 together with shaft members 6, 7 move up and down integrally.

The shaft member 6 comprises a large-diameter portion 6a and a small-diameter portion 6b in the inside of the compression coil spring 8. The small-diameter portion 6b is penetrating the shaft passing hole 27a and a hole on the middle wall 24, and the shaft member 7 is contained in the cylindrical hole 25 above the middle wall 24 so as to be capable of upward and downward movement.

The bottom end of the compression coil spring 9 for causing the rod 4 to protrude is held by the flange 7a of the shaft member 7, the top end of the compression coil spring 9 is held by the output member 39 screwed and fixed to the top end of the rod 4, and the compression coil spring 9 elastically urges the rod 4 upward with respect to the shaft member 7. When supporting the workpiece, the urging force of the compression coil spring 9 (in other words, the spring length and spring coefficient) is set to be able to drive the rod 4 upward against the weight of the rod 4 so that when the output member 39 comes in contact with the workpiece 2, the rod 4 contacts the workpiece 2 with an extremely weak urging force so as to cause almost no elastic deformation of the workpiece 2.

Next, the operation of the workpiece support 1 will be described.

When workpiece 2 for machining is supported from underneath by one or more workpiece supports 1 in a preparatory stage for machining, a condition is established in which the workpiece 2 is set on top of the workpiece support 1 as shown in FIGS. 2 and 3 and arranged such that the external peripheral portion of the workpiece 2 can be clamped by a plurality of clamping devices (not shown), and oil pressure is then supplied from the oil pressure supply source to the hydraulic operating chamber 16. Whereupon, the hydraulic cylinder 5 is actuated, the shaft member 7 and the piston member 29 including the shaft member 6 are moved upward against the urging force of the compression coil spring 8, the compression coil spring 9 is compressed, the urging force thereof increases, and the rod 4 is moved upward by the weak urging force of the compression coil spring 9.

The output member 39 of the rod 4 comes in contact with the workpiece 2, the rod 4 enters a stopped position, oil pressure acts on the external peripheral hydraulic chamber 22 on the external periphery of the sleeve body 10, the thin-walled cylinder 20 of the sleeve body, 10 is elastically deformed so as to shrink in diameter, and the rod 4 is securely locked. The workpiece 2 is thus clamped and fixed in place by a plurality of clamping devices while being supported by one or more workpiece supports 1, and machining is performed with the workpiece in this state.

Also, the narrow-bore oil passages 36 is provided, whereby oil pressure is caused to act on the external peripheral hydraulic chamber 22 after the rod 4 is raised, but by appropriately setting the number, length, and diameter of the narrow-bore oil passages 36, the timing with which the oil pressure acts on the external peripheral hydraulic chamber 22 is appropriately set.

When the rod 4 is retracted after the workpiece 2 has been completely machined, the shaft members 6, 7 and piston member 29 receive the urging force of the spring member 8, as shown in FIG. 3, once the valve of the oil pressure supply source is switched to the discharge position, the shaft members 7 and the shaft 6 and the piston member 29 are moved downward, the flange 7a of the shaft member 7 comes in contact with the middle wall 24, the piston member 29 is moved to the retracted position, and the rod 4 is retracted.

When the rod 4 is retracted, compressed air at a pressure (0.02 MPa, for example) that is equal to or greater than the contact pressure of the scraper 14 is supplied from a compressed air supply source (not shown) to the air input port 18, the compressed air is supplied to the air passage 28 from the air input port 18, and the air is expelled from the small gap between the rod 4 and the scraper 14. Almost all cutting oil, fine shavings, dust, and other debris adhered to the external peripheral surface of the rod 4 are scraped off by the scraper 14 when the rod 4 is retracted, and the debris scraped off and separated from the surface of the rod 4 is thoroughly blown off by the compressed air stream 50 expelled from the small gap between the rod 4 and the scraper 14.

As a result, no cutting oil, fine shavings, and dust will penetrate to the inside through the small gap between the rod 4 and the scraper 14. Smooth operation of the rod 4 can thereby be assured, and durability is enhanced. In other words, when the rod 4 moves upward, the rod 4 can move continuously and smoothly by the urging force of the compression coil spring 9, and locking of the rod 4 resulting in an inability to retract, and other operational failures, can be prevented. Damage and abrasion to the rod 4 and sleeve body 10 can also be prevented.

Cutting oil also does not penetrate to the inside from the small gap between the rod 4 and the scraper 14, so there is no reduction in friction between the rod 4 and the sleeve body 10, and the reliability of the operation whereby the rod 4 is locked is also enhanced.

Also, the aforementioned example was described with reference to a case in which compressed air was supplied and expelled solely when the rod 4 was caused to retract, but the compressed air may be continuously supplied and expelled during use of the workpiece support 1 and during retraction of the rod 4.

Specifically, this is because fine shavings and dust can penetrate into the small gap between the rod 4 and the scraper 14 due to vibration of the rod 4 during machining. However, in this case, the air passage 28 is formed so as not to be blocked even when the sleeve body 10 is elastically deformed so as to shrink in diameter.

Also, when compressed air is supplied to the air passage 28 and maintained in a filling state at a pressure about the same as the contact pressure of the scraper 14, the compressed air in the air passage 28 can be maintained at inner pressure to prevent penetration of cutting oil, fine shavings, dust, and the like.

Partial modifications of the present embodiment will next be described.

The same symbols are used for the same members with the aforementioned embodiment, and description thereof is omitted as appropriate.

Figure 4:
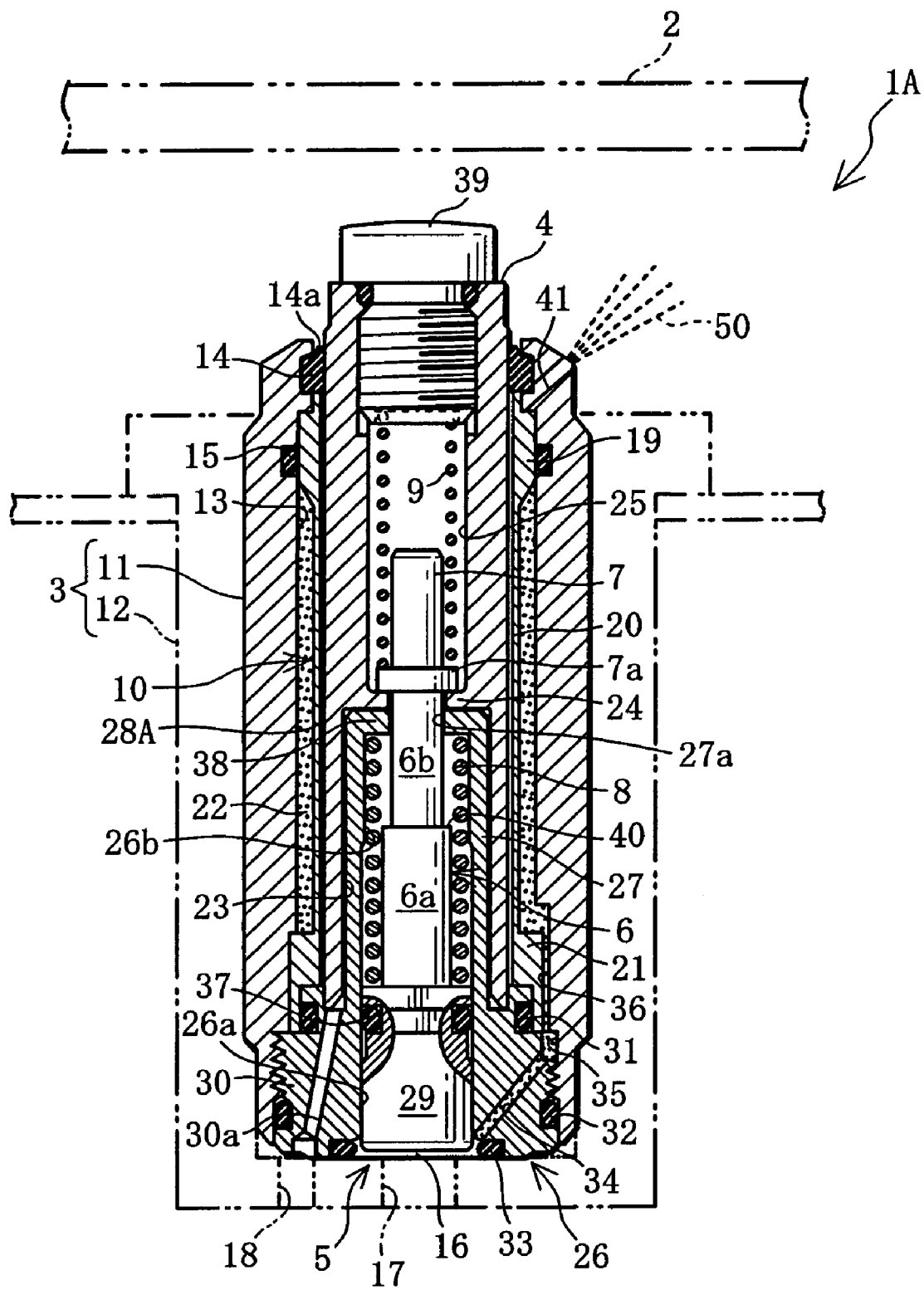
FIG. 4 is a vertically cross-sectional view of the workpiece support of a modified embodiment state.

1) As shown in FIG. 4, in the workpiece support 1A according to a modified embodiment, an air passage 28A is formed between the rod 4 and the internal peripheral surface of the sleeve body 10, and a plurality (16, for example) of air nozzles 41 connected to the air passage 28A are formed in the top end wall of the case main body 11A in at regular intervals in the peripheral direction, tilted upward in the outward direction. These air nozzles 41 are configured so as to form an air curtain from the compressed air stream 50 to cover the external periphery of the rod 4 protruding out from the top end of the case main body 11A. The air passage 28A is configured to be able to function as an air passage even if the sleeve body 10 were to undergo elastic deformation.

During operation of the workpiece support 1 and during retraction of the rod 4, compressed air is continuously supplied from the air input port 18 to the air passage 28A, and an air curtain from a plurality of air nozzles 41 is formed from the compressed air stream 50 so as to cover the external periphery of the rod 4 protruding out from the top end of the case member 3. The aforementioned cutting oil and fine shavings, are blocked by the air curtain and cease to penetrate to the inside from the small gap between the rod 4 and the scraper 14. Also, when there is a small gap between the rod 4 and the scraper 14, compressed air is expelled from the small gap as well.

2) In the workpiece support 1, compressed air may be continuously supplied to the air passage 28 from the air input port 18 or may be supplied intermittently when the rod 4 is retracted. The pressure of the compressed air may be set higher or lower than 0.02 MPa according to the abrasive degree of the scraper 14, the type of cutting oil, the material of the workpiece piece2, and the like.

3) The number, diameter, tilt angle, and other aspects of the plurality of air nozzles 41 in the aforementioned workpiece support 1A are not limited by the previous example, for example, a plurality of air nozzles 41 may be formed parallel to the rod 4, and the air nozzles 41 may be formed having a cross-sectional arc shape. There may also be other aspects in which various modifications to the aforementioned embodiment are implemented insofar as such modifications are within a range of the essence of the present invention.

The invention claimed is:

1. A workpiece support comprising:
   a rod;
   a sleeve body externally fitted on the rod and elastically deformable so as to shrink in diameter;
   a case member supporting the sleeve body;
   a scraper externally fitted on the rod and retained at the case member for scraping debris adhering to the external peripheral surface of the rod when the rod is retracted;
   an external peripheral hydraulic chamber formed on the external periphery of the sleeve body;
   an oil passage for supplying oil pressure to the external peripheral hydraulic chamber;
   an air passage formed between the rod and the internal peripheral surface of the sleeve body and connected to the gap between the rod and the scraper;
   a plurality of air nozzles formed in an end portion of the case member so as to connect with the air passage, the plurality of air nozzles forming a curtain of compressed air so as to cover the external periphery of the rod protruding outside said end of the case member; and
   an air input port for supplying compressed air to the air passage.

2. A workpiece support comprising:
   a rod;
   a sleeve body externally fitted on the rod and elastically deformable so as to shrink in diameter;
   a case member for supporting the sleeve body;
   a scraper externally fitted on the rod and retained at the case member for scraping debris adhering to the external peripheral surface of the rod when the rod is retracted;
   an external peripheral hydraulic chamber formed on the external periphery of the sleeve body;
   an oil passage for supplying oil pressure to the external peripheral hydraulic chamber;
   an air passage formed between the rod and the internal peripheral surface of the sleeve body;
   a plurality of air nozzles formed in an end portion of the case member so as to connect with the air passage, the plurality of air nozzles forming a curtain of compressed air so as to cover the external periphery of the rod protruding outside said end of the case member; and
   an air input port for supplying compressed air to the air passage.

3. The workpiece support according to claim 1 further comprising a hydraulic cylinder for actuating the rod so that the rod protrudes from the leading end of the case member.

4. The workpiece support according to claim 2 further comprising a hydraulic cylinder for actuating the rod so that the rod protrudes from the leading end of the case member.

* * * * *